(12) United States Patent
Shajii et al.

(10) Patent No.: US 7,073,771 B2
(45) Date of Patent: Jul. 11, 2006

(54) POROUS VALVE ASSEMBLY

(75) Inventors: Ali Shajii, Canton, MA (US); Ronald W. Collins, Jr., Londonderry, NH (US); Matthew Besen, Andover, MA (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 10/814,973

(22) Filed: Mar. 30, 2004

(65) Prior Publication Data

US 2005/0218361 A1  Oct. 6, 2005

(51) Int. Cl.
*F16K 7/00* (2006.01)
(52) U.S. Cl. .................. 251/129.04; 251/318; 251/905
(58) Field of Classification Search ........... 251/129.04, 251/318, 905
See application file for complete search history.

(56) References Cited

U.S. PATENT DOCUMENTS

| | | | | | |
|---|---|---|---|---|---|
| 1,668,165 | A | * | 5/1928 | McCann | 251/52 |
| 2,466,304 | A | * | 4/1949 | Cooney | 210/136 |
| 4,572,783 | A | * | 2/1986 | Watson | 210/109 |
| 4,796,854 | A | | 1/1989 | Ewing | 251/129.07 |
| 4,925,153 | A | * | 5/1990 | Romer | 251/30.01 |
| 5,273,561 | A | * | 12/1993 | Zeren | 96/406 |
| 5,533,545 | A | * | 7/1996 | Robinson | 137/195 |

OTHER PUBLICATIONS

© 2000 MKS Instruments, Inc., "Pressure-Based Mass Flo® Controller For Ion Implant Applications Type 1640," Bulletin 1640-4/00.
© 2000 MKS Instruments, Inc., "Metal-Sealed Mass-Flo® Controller Type 1479A," Bulletin 1479A-5/00.
PCT International Search Report (3 sheets).
Written Opinion of the International Searching Authority (3 sheets).

* cited by examiner

*Primary Examiner*—J. Casimer Jacyna
(74) *Attorney, Agent, or Firm*—McDermott Will & Emery LLP

(57) ABSTRACT

A valve assembly for controlling the flow of a predetermined fluid, including a tube having an open end forming an outlet port, and wherein the tube is made of a material that is porous with respect to the predetermined fluid, an outer wall forming a fluid chamber coaxially surrounding the porous tube and including an inlet port, and a valve member made of non-porous material received for sliding movement within the porous tube. Sliding movement of the valve member within the tube and towards the open end of the tube reduces the flow of the predetermined fluid from the fluid chamber, through the porous tube and through the outlet of the valve assembly, while sliding movement of the valve member within the tube and away from the open end of the tube increases the flow of the predetermined fluid from the fluid chamber, through the porous tube and through the outlet of the valve assembly.

19 Claims, 2 Drawing Sheets

POROUS VALVE ASSEMBLY

FIELD OF THE INVENTION

The present invention relates to the field of fluid flow control and, more particularly, to a valve assembly. Even more particularly, the present invention relates to a new and improved all metal porous valve assembly.

BACKGROUND OF THE INVENTION

Fluid valves exist in a wide variety of forms and sizes, serving a multitude of purposes, handling flowable materials including those ranging from light gas to heavy slurries and near-solids, and operable at various speeds under controls as diverse as simple binary (ON-OFF), proportional, direct-manual and remote-electrical. Those which are capable of responding quickly to govern even relatively large flows with precision, and with expenditure of little electrical power, are of special interest in certain industrial processing, such as the automatic regulation of gases in semiconductor and integrated-circuit manufacture. Mass flow controllers, for example, are widely used in semiconductor and integrated-circuit manufacturing to control the delivery of process gases, and the mass flow controllers include such valves.

U.S. Pat. No. 4,796,854 shows a proportional-control solenoid-actuated valve assembly, capable of governing relatively large volumes and rates of flow swiftly and accurately with expenditure of relatively little electrical power. The disclosed valve assembly includes a movable valve member positioned by an armature having a substantially frictionless spring suspension, the armature being under influence of a special force-counterbalancer in the form of a bellows proportioned and disposed to exert upon it, automatically, neutralizing forces which are substantially equal and opposite to unavoidable pressure-induced imbalances afflicting the valve member. The same pressures which tend to unbalance the valve member are impressed upon opposite sides of the bellows, one through an enabling bleed port, and resulting forces developed by the bellows over a defined area are exerted upon the armature mechanically in a counterbalancing sense.

Other examples of more refined valve assemblies can be found in the Type 1479 and Type 1640 mass flow controllers available from MKS Instruments, Inc. of Andover, Mass. (http://www.mksinst.com). As is known, a MFC is for controlling the flow rate of a gas from a source and can be used, for example, in the semiconductor manufacturing industry to precisely deliver a process vapor to a process chamber for making a semiconductor wafer. The MFC can be a temperature-based MFC or a pressure-based MFC, as well as other types of flow control devices. The MFC generally includes a flow path connected to an entering flow path of the valve assembly, a flow sensor assembly for sensing flow through the flow path, and a control device programmed to receive a predetermined desired flow rate from a user, receive an indication of flow from the flow sensor assembly, and determine an actual flow rate through the flow path. The control device is also programmed to instruct the valve assembly to increase flow, if the actual flow rate is less than the desired flow rate, and to decrease flow, if the actual flow rate is greater than the desired flow rate. The control device can comprise a computer processing unit (CPU) including at least a processor, memory and clock mounted on a circuit board. The control device operates in a feedback loop to maintain the desired flow at all times. When used with a proportional-control solenoid-actuated valve assembly, information on flow rate as a function of the valve assembly control current is preferably stored in the control device in order to quicken the response time of the MFC.

These existing designs, accordingly, provide excellent proportional-control solenoid-type valves which can swiftly and accurately govern even relatively large volumes and high rates of fluid flow using relatively low levels of electrical power, since the valves are aided by the force counterbalancing achieved through the use of the bellows-type coupling. These existing valve assemblies also provide sensitive and precise valving by way of the frictionless suspension of broad-area valve members and the counterbalancing of undesirable pressure-generated forces through a correlated pressure-responsive coupling. One drawback of solenoid valves, however, is that they are relatively expensive, have a low range, and are sensitive to vibrations.

What is still desired is a new and improved valve assembly. The valve assembly will preferably provide the benefits of previous valve assemblies, yet will be relatively inexpensive, have a wide dynamic range, and provide linear operating conditions (flow versus valve member position). The valve assembly will preferably also be capable of all metal construction so that the valve assembly can be used in a variety of gas flow applications.

SUMMARY OF THE INVENTION

The present invention provides a valve assembly for controlling the flow of a predetermined fluid, including a tube having an open end forming an outlet port of the valve assembly, and wherein the tube is made of a material that is porous with respect to the predetermined fluid, an outer wall forming a fluid chamber coaxially surrounding the porous tube and including an inlet port of the valve assembly, and a valve member made of non-porous material with respect to the predetermined fluid and received for sliding movement within the porous tube. Sliding movement of the valve member within the tube and towards the open end of the tube reduces the flow of the predetermined fluid from the fluid chamber, through the porous tube and through the outlet of the valve assembly, while sliding movement of the valve member within the tube and away from the open end of the tube increases flow of the predetermined fluid from the fluid chamber, through the porous tube and through the outlet of the valve assembly.

Among other features and benefits, a valve assembly constructed in accordance with the present invention has been found to provide the benefits of previous valve assemblies, yet is relatively inexpensive, has a wide dynamic range, and provides linear operating conditions. The valve assembly is also capable of all metal construction so that the valve assembly can be used in a variety of gas flow applications.

These and other features and benefits of the present invention will become more apparent upon reading the following detailed description in combination with the accompanying drawings.

BRIEF DESCRIPTION OF THE DRAWINGS

The foregoing and other features and advantages of this invention will be better understood from the detailed description and the drawings, in which.

Like reference characters designate identical or corresponding components and units throughout the several views.

DETAILED DESCRIPTION OF EXEMPLARY EMBODIMENTS

Figure 1:
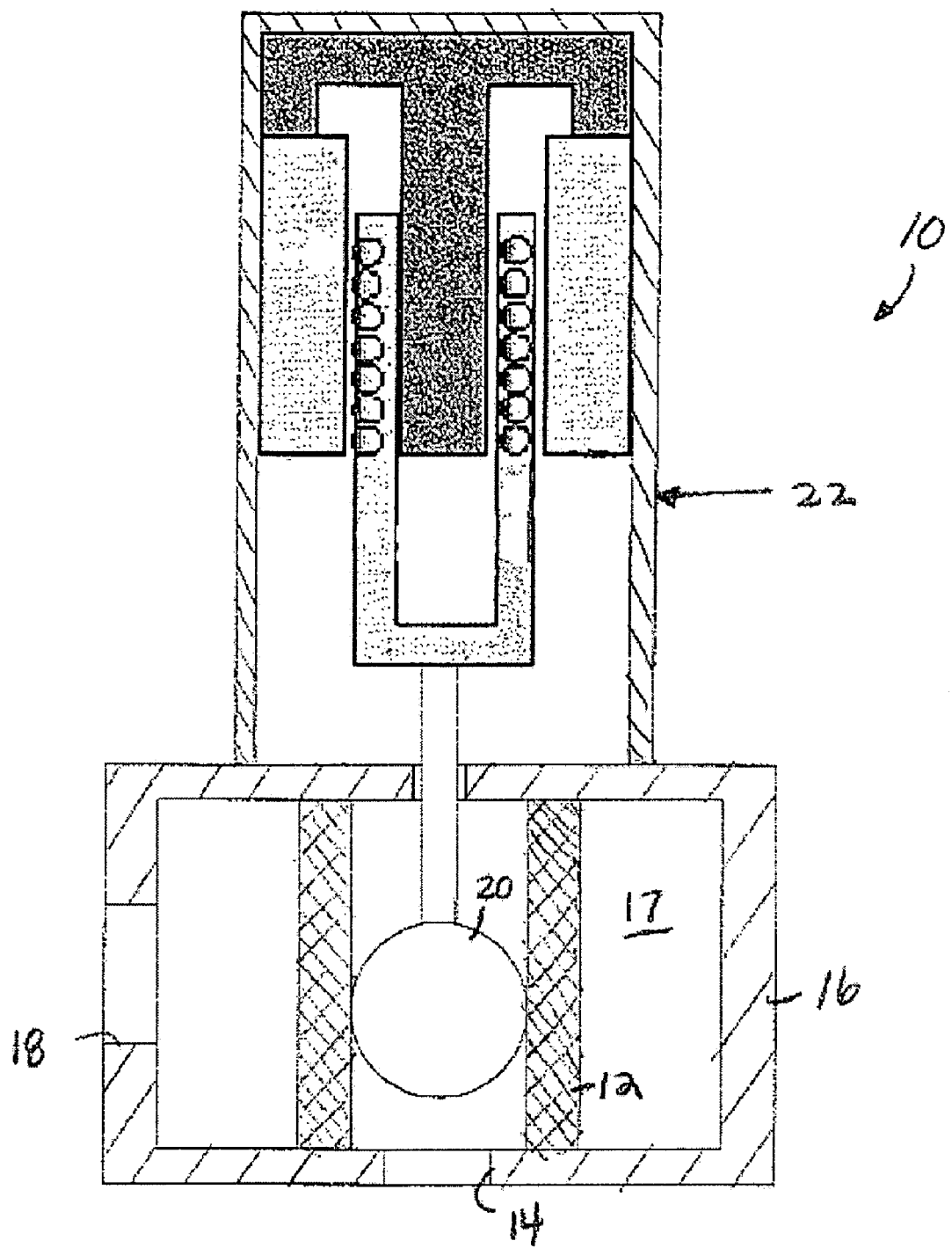
FIG. 1 is a schematic diagram of an exemplary embodiment of a valve assembly constructed in accordance with the present invention.

An exemplary embodiment of a valve assembly 10 constructed in accordance with the present invention is shown in FIG. 1. The valve assembly 10 is for controlling the flow of a predetermined fluid, such as a process gas used in semiconductor and integrated-circuit manufacturing.

The valve assembly 10 includes a tube 12 having an open end located over an outlet port 14 of the valve assembly. The tube 12 is made of a material that is porous with respect to the predetermined fluid. The valve assembly 10 also includes an outer wall 16, made of non-porous material with respect to the predetermined fluid, and forming a fluid chamber 17 coaxially surrounding the porous tube 12 and including an inlet port 18 of the valve assembly. A valve member 20 made of non-porous material with respect to the predetermined fluid, is received for sliding movement within the porous tube 12.

Sliding movement of the valve member 20 within the tube 12 and towards the outlet port 14 of the valve assembly 10 reduces the flow of the predetermined fluid from the fluid chamber 17, through the porous tube 12 and through the outlet port 14 of the valve assembly, while sliding movement of the valve member 20 within the tube 12 and away from the outlet port 14 increases flow of the predetermined fluid from the fluid chamber 17, through the porous tube 12 and through the outlet port 14.

According to one exemplary embodiment, the porous tube 12, the outer wall 16 and the valve member 20 are each made of a metal, such as stainless steel, that is suitable for use with process gases in semiconductor and integrated-circuit manufacturing.

The valve assembly 10 also includes an actuator 22 for moving the valve member 20 within the tube 12 to open and close the outlet port 14 of the valve assembly. The actuator can comprise many types of actuators. For example, the actuator can comprise an electromechanical actuator such as a solenoid, a rotational motor or a voice coil actuator.

In one exemplary embodiment, the actuator comprises a voice coil actuator 22. Voice coil actuators are two wire non-commutated direct-drive, hysteresis-free, cog-free devices used for providing highly accurate linear motion. By virtue of their high acceleration and the absence of commutation, they offer numerous advantages in semi-conductor applications. For example, they deliver infinite position sensitivity, limited only by an encoder used for feedback, and a force-versus-stroke curve that is perfectly smooth. Voice coil actuators are ideal for short stroke (e.g., less than 0.02 inches) closed loop servo applications. Their compact size allows them to fit into small spaces, such as a flow controller. Voice coil actuators also have very low electrical and mechanical time constants, their low moving mass allows for high accelerations of light payloads. In addition, voice coil actuators are wound in such a way that no commutation is required for motion to occur, thereby providing a much simpler and more reliable system. Coupling the actuators with a bearing system, position feedback device, linear servo amplifier and motion controller yields a system that is capable of intricate position, velocity, and acceleration control. The actuator 22 can also be used for precise force control because of the linear force versus current characteristics.

Figure 2:
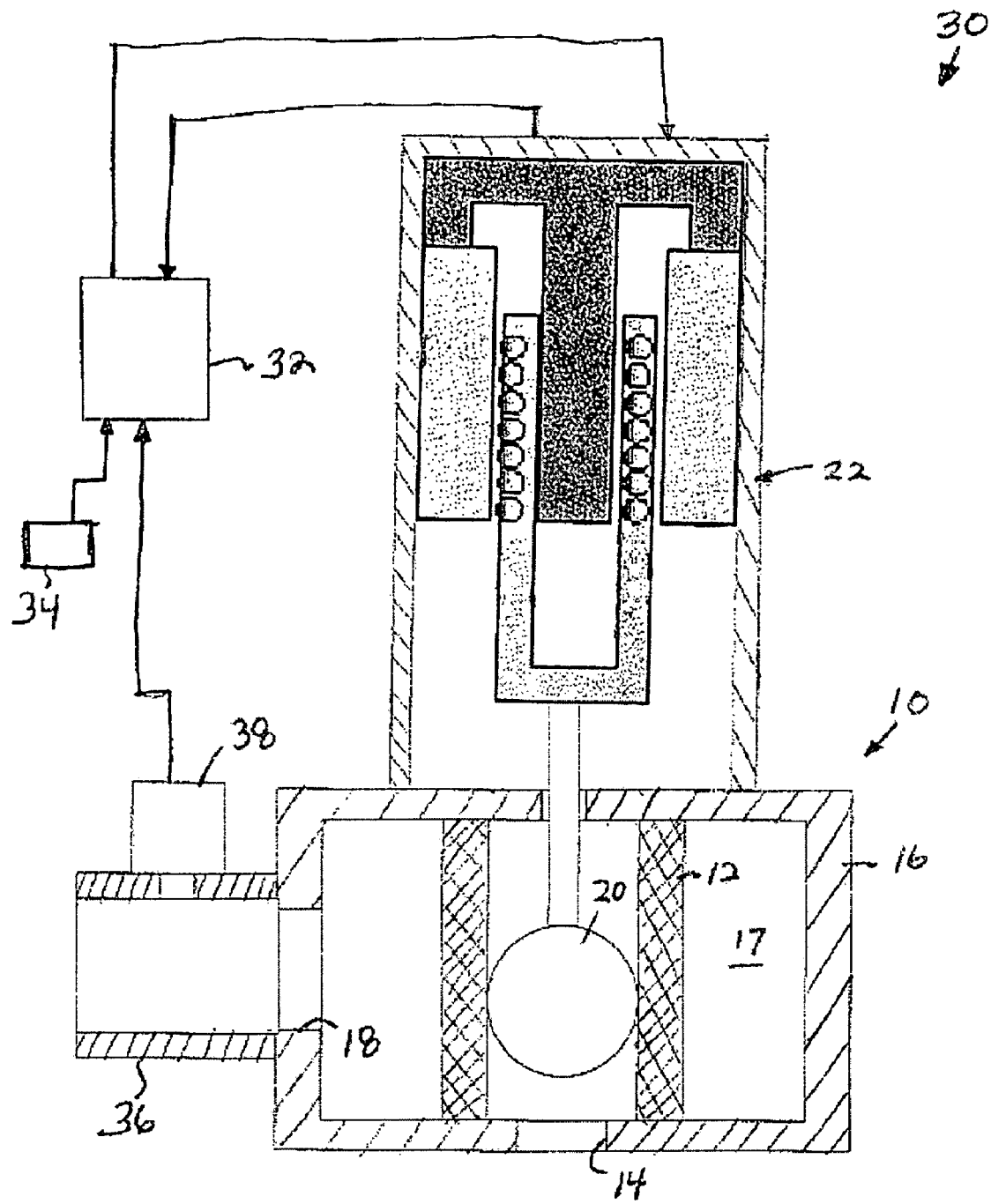
FIG. 2 is a schematic diagram of an exemplary embodiment of a flow controller constructed in accordance with the present invention and including the valve assembly of FIG. 1.

As an example of an application for the valve assembly 10 of FIG. 1, the valve assembly 10 can be incorporated into a mass flow controller (MFC) 30, as shown in FIG. 2. As is known, a MFC is for controlling the flow rate of a gas from a source and can be used, for example, in the semiconductor manufacturing industry to precisely deliver a process vapor to a process chamber for making a semiconductor wafer.

The MFC 30 includes a control device 32 for controlling the linear actuator 22. By "control device" it is meant herein a device or mechanism used to regulate or guide the operation of the MFC 30. The control device 32 preferably comprises a computer processing unit (CPU) including at least a processor, memory and clock mounted on a circuit board. The control device 32 operates in a feedback loop to maintain the desired flow at all times. Information on flow rate as a function of the valve assembly control current is preferably stored in the control device 32 in order to quicken the response time of the MFC 30.

According to one exemplary embodiment of the present disclosure, the control device 32 is programmed to receive a desired flow rate from a user input device 34, such as a keyboard and monitor, receive an indication of axial position of the valve member 20 within the tube from the voice coil actuator 22, determine an actual flow rate through the valve assembly 10 based on the axial position, or vertical height, of the valve member 20, and cause the voice coil linear actuator 22 to open further if the actual flow rate is less than the desired flow rate and cause the voice coil linear actuator 22 to close further if the actual flow rate is greater than the desired flow rate.

The MFC 32 also includes a flow path 36 connected to the inlet port 18 of the valve assembly 10, and a pressure transducer 38 for sensing fluid pressure within the flow path. The pressure transducer 38, which may for example comprise a Baratron® pressure transducer available from MKS Instruments, Inc. of Andover, Mass. (http://www.mksinst-.com), is connected to the control device 32. The control device 32, in turn, is programmed to determine the actual flow rate using variations in the inlet pressure 18 based upon the following equation:

$$Q = C d_h^2 \, (300K/T) \, P_i^2/\mu 300K \, (1-(P_e^2/P_i^2))d \, 1/L$$

Wherein Q is the flow through the porous tube 12, C is a dimensionless constant of the porous tube 12, $d_h$ is proportional to the pore size of the tube 12, T is the ambient temperature, $\mu$ is the gas viscosity, $P_i$ is the inlet pressure and $P_e$ is the outlet pressure, while d is the average diameter of the tube 12, L is the total length of the tube 12, and 1 is the vertical location of the valve member 20 within the tube 12.

As expected, the flow is linearly proportional to the vertical location of the valve member 20 within the tube 12. In addition, for many practical applications where $P_e/P_i < 0.1$, the correction due to the variation of the outlet pressure is less than 2%. The flow across the valve assembly 10 varies as inlet pressure squared, $P_i^2$, and is corrected by the control device 32 using readings from the inlet pressure transducer 38. The flow across the valve assembly 10 also inversely varies with the ambient temperature T, which can be manually input to the control device 32 using the user input device 34 or can be automatically input to the control device using a thermometer (not show). The flow across the valve assembly 10 also inversely varies with the gas viscosity, which can be manually input to the control device 32 using the user input device 34.

According to one exemplary embodiment, the porous tube 12 has an average diameter of about 4 mm, a height of about 1.1 cm, and a thickness of about 1 mm. In addition, a total flow through the valve assembly 10 is about 10 SLM, a clearance between the valve member 20 and the tube 12 is about 0.06 mils, and a force of about 2 lbs. is required to move the valve member 20 within the porous tube 12. Furthermore, the valve member 20 is spherical and has a diameter of about 3 mm.

Among other features and benefits, a valve assembly 10 constructed in accordance with the present invention has been found to provide the benefits of previous valve assemblies, yet is relatively inexpensive, has a wide dynamic range, and provides linear operating conditions. The valve assembly 10 is also capable of all metal construction so that the valve assembly can be used in a variety of gas flow applications. In addition, the valve assembly 10 provides accurate flow measurement capability using position sensing of a voice coil actuator 22.

The embodiments and practices described in this specification have been presented by way of illustration rather than limitation, and various modifications, combinations and substitutions may be effected by those skilled in the art without departure either in spirit or scope from this invention in its broader aspects and as set forth in the appended claims.

What is claimed is:

1. A valve assembly for controlling the flow of a predetermined fluid, comprising:
    a tube having an open end forming an outlet port of the valve assembly, and wherein the tube is made of a material that is porous with respect to the predetermined fluid;
    an outer wall forming a fluid chamber coaxially surrounding the porous tube and including an inlet port of the valve assembly;
    a valve member made of non-porous material with respect to the predetermined fluid and received for sliding movement within the porous tube, wherein sliding movement of the valve member within the tube and towards the open end of the tube reduces flow of the predetermined fluid from the fluid chamber, through the porous tube and through the outlet of the valve assembly, while sliding movement of the valve member within the tube and away from the open end of the tube increases flow of the predetermined fluid from the fluid chamber, through the porous tube and through the outlet of the valve assembly; and
    an actuator connected to the valve member for causing sliding movement of the valve member within the porous tube.

2. A valve assembly according to claim 1, wherein the porous tube, the outer wall and the valve member are each made of a metal.

3. A valve assembly according to claim 1, wherein the porous tube, the outer wall and the valve member are each made of stainless steel.

4. A valve assembly according to claim 1, wherein the actuator comprises an electromechanical actuator.

5. A valve assembly according to claim 4, wherein the actuator comprises a voice coil linear actuator.

6. A valve assembly according to claim 5, wherein the voice coil linear actuator includes a position sensor for providing an indication of an axial position of the valve member within the tube.

7. A flow controller including a valve assembly according to claim 6, and further comprising a control device connected to the voice coil linear actuator and programmed to receive a desired flow rate from a user input device, receive an indication of axial position of the valve member within the tube from the position sensor, determine an actual flow rate through the flow controller based on the axial position of the valve member, and cause the voice coil linear actuator to open further if the actual flow rate is less than the desired flow rate and cause the voice coil linear actuator to close further if the actual flow rate is greater than the desired flow rate.

8. A flow controller according to claim 7, and further comprising:
    an inlet flow path connected to the inlet port of the valve assembly; and
    a pressure sensor connected to the inlet flow path for sensing an inlet pressure of the flow controller, wherein the pressure sensor is connected to the control device and the control device is programmed to determine the actual flow rate based upon variations in the inlet pressure.

9. A flow controller according to claim 7, wherein the control device is further programmed to determine the actual flow rate based upon variations in ambient temperature.

10. A flow controller according to claim 7, wherein the control device is further programmed to determine the actual flow rate based upon properties of the predetermined fluid, including temperature.

11. A semiconductor manufacturing system including the flow controller of claim 7 and further comprising a source of process gas connected to a process chamber through the flow controller.

12. A valve assembly according to claim 1, wherein the porous tube has an average diameter of about 4 mm.

13. A valve assembly according to claim 1, wherein the porous tube has a height of about 1.1 cm.

14. A valve assembly according to claim 1, wherein the porous tube has a thickness of about 1 mm.

15. A valve assembly according to claim 1, wherein a total flow through the valve assembly is about 10 SLM.

16. A valve assembly according to claim 1, wherein a clearance between the valve member and the tube is about 0.06 mils.

17. A valve assembly according to claim 1, wherein a force of about 2 lbs. is required to move the valve member within the porous tube.

18. A valve assembly according to claim 1, wherein the valve member is spherical.

19. A valve assembly according to claim 18, wherein the spherical valve member has a diameter of about 3 mm.

* * * * *